United States Patent [19]

Fallin

[11] Patent Number: 4,891,805
[45] Date of Patent: Jan. 2, 1990

[54] MULTIPLEXER WITH DYNAMIC BANDWIDTH ALLOCATION

[75] Inventor: David B. Fallin, Sunrise, Fla.

[73] Assignee: Racal Data Communications Inc., Sunrise, Fla.

[21] Appl. No.: 207,558

[22] Filed: Jun. 13, 1988

[51] Int. Cl.[4] .............................................. H04J 3/16
[52] U.S. Cl. .................................... 370/95.1; 370/118
[58] Field of Search .................. 370/95, 84, 118, 109, 370/79

[56] References Cited

U.S. PATENT DOCUMENTS

| | | |
|---|---|---|
| 3,692,942 | 9/1972 | Inose et al. . |
| 3,742,145 | 6/1973 | Clark et al. . |
| 3,982,077 | 9/1976 | Clark et al. . |
| 4,204,093 | 5/1980 | Yeh ........................................ 370/95 |
| 4,488,293 | 12/1984 | Haussmann et al. ................... 370/84 |
| 4,550,399 | 10/1985 | Caron .................................... 370/118 |
| 4,763,325 | 8/1988 | Wolfe et al. ........................... 370/95 |

Primary Examiner—Benedict V. Safourek
Assistant Examiner—Wellington Chin
Attorney, Agent, or Firm—Jerry A. Miller

[57] ABSTRACT

A method and apparatus for assigning time slots in a frame of time slots used for time division multiplexing, the time slots being representable as a position within the frame, in which it is determined what quantity of the time slots are required to provide a needed amount of bandwidth. A random number generator (40) generates (92) a uniformly distributed random number which is scaled (94) to represent a position in the first portion of the frame. A first of the positions within the frame is assigned based upon the value of the randon number. The remaining positions are assigned by fitting (64) the remaining required positions to the available positions in the frame spacing them at approximately equally spaced intervals as available. This prevents bunching of the used time solts which would otherwise prevent dynamic allocation of large blocks of bandwidth in the frame without complete recalculation of the frame.

14 Claims, 7 Drawing Sheets

MULTIPLEXER WITH DYNAMIC BANDWIDTH ALLOCATION

BACKGROUND

1. Field of the Invention

This invention relates generally to the field of time division multiplexing. More particularly to this invention relates to a method and apparatus for assigning time slots within a frame of time slots in a time division multiplexer capable of dynamic bandwidth allocation.

2. Background of the Invention

In time division multiplexers, a frame of time slots is repeatedly transmitted with one or more time slots being used to provide the bandwidth needed by each of the multiplexer channels. When such a multiplexer is required to dynamically create and tear down connections (channels) of varying bandwidth, the process of doing so can create gaps or large areas of consecutive time slots that are unavailable for allocation in the frame. This phenomenon sometimes causes inefficiencies and also sometimes results in the inability to create a connection even though adequate bandwidth exists within the frame. This is because although adequate bandwidth may exist, the location of the time slots within the frame may be such that allocation of the available time slots is impossible due to constraints in buffer size. That is, if the available time slots are assigned, a buffer overflow or underflow will result. One solution to this problem might be to redistribute the entire frame every time a new connection is required. However, this proposed solution requires a substantial level of computing effort, a rearrangement of the frame on each node in the network and an additional delay for each connection setup. Accordingly, the solution proposed by the present invention, while not guaranteed to be optimal, provides a practical mechanism for accommodating new call set-ups under most circumstances.

SUMMARY OF THE INVENTION

It is an object of the present invention to provide an improved method and apparatus for computing a slot list for use in time division multiplexing systems.

It is a further object of the present invention to provide such a method which additionally tends to distribute the allocation of bandwidth across the frame in a manner which tends to prevent the gapping phenomenon.

It is an advantage of the present invention that connections can be rapidly set up with a high likelihood of success and without recalculation of the existing slot list for each connection.

The present invention also has the advantage of being completely independent of the order in which the connections are set up and will work with any size connection (within system constraints). It is independent of the size and location of any bandwidth reserved for system overhead as well.

These and other objects and advantages of the invention will become apparent to those skilled in the art upon consideration of the following description of the invention In one embodiment of the present invention, a method of assigning time slots in a frame used for time division multiplexing, each time slot being representable as a position within the frame, includes the steps of determining a quantity of the time slots which are required to provide a needed amount of bandwidth, the quantity including a first time slot and one or more remaining time slots; generating a random number; assigning a first of the positions within the frame of a first of the quantity of time slots based upon the value of the random number; and assigning one or more additional positions for the one or more remaining time slots.

In another embodiment of the present invention, an apparatus for assigning time slots in a frame used for time division multiplexing, each time slot being representable as a position within the frame, includes means for determining a quantity of the time slots which are required to provide a needed amount of bandwidth, the quantity including a fist time slot and one or more remaining time slots. A random number generator generates a random number. A slot allocation computer assigns a first of the positions within the frame to a first of the quantity of time slots based upon the value of the random number, and assigns one or more additional positions for the one or more remaining time slots.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
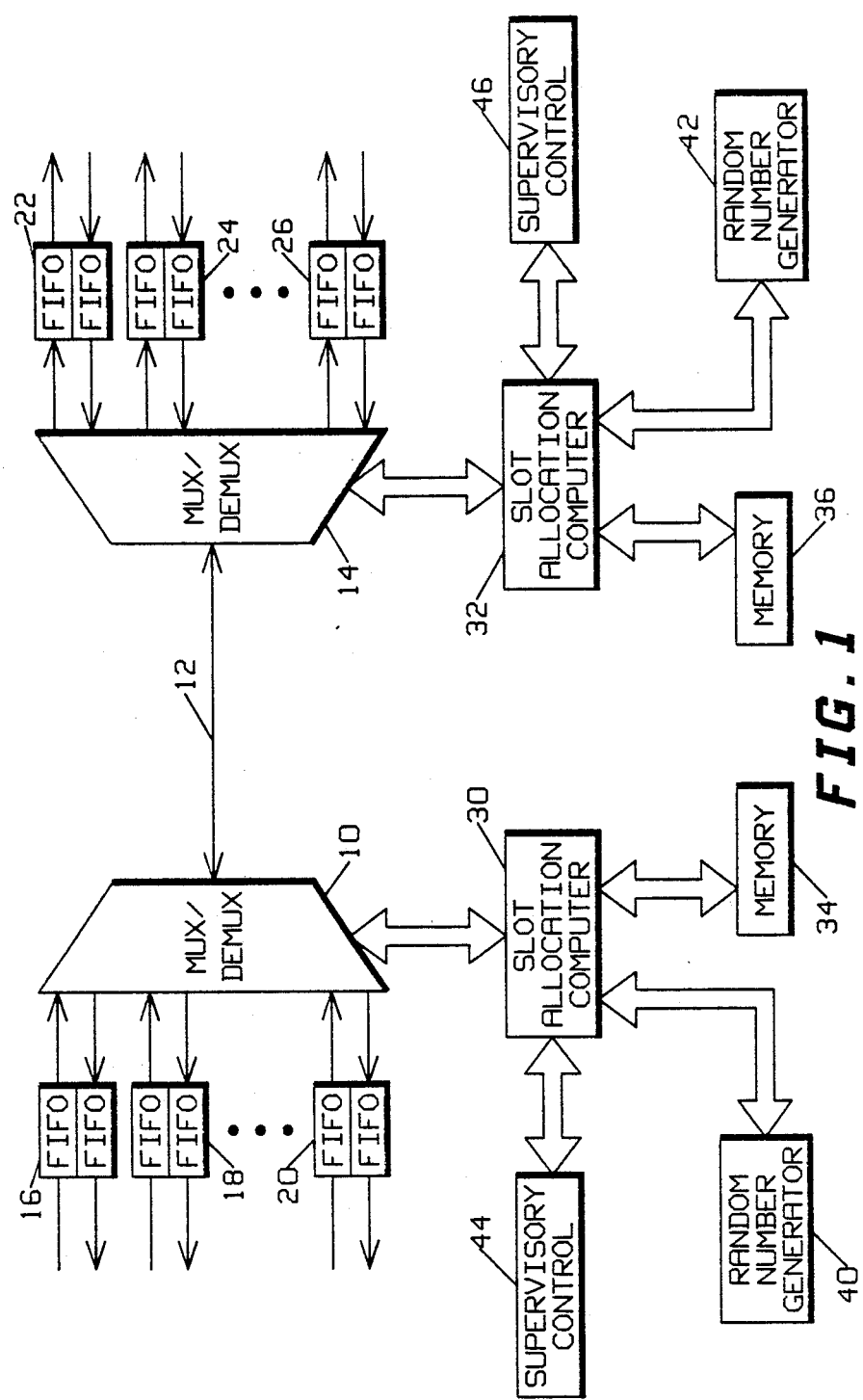
FIG. 1 shows a multiplexer/demultiplexer (mux/demux) according to the embodiment of the present invention.

Turning now to FIG. 1, a multiplexer/demultiplexer system suitable for use of the present invention is shown wherein a multiplexer/demultiplexer (referred to collectively and interchangeably as a mux) 10 is coupled via a transmission line 12 to a second mux 14. Mux 10 includes a plurality of input/output channels each having its own associated FIFO buffers 16, 18 through 20. Similarly mux 14 has an associated plurality of FIFO buffers 22, 24–26. Each of the associated multiplexer has an associated slot allocation computer 30 and 32 respectively which utilize memory 34 and 36 respectively.

Also associated with the slot allocation computers 30 and 32 are random number generators 40 and 42. The slot allocation computers 30 and 32 are used to compute the slot list as will be described later. The slot allocation computers 30 and 32 respond to commands issued from supervisory control 44 and 46 respectively.

The supervisory control blocks 44 and 46 represent any of a number of possible devices which request slot allocation of the slot allocation computer. For example, supervisory control 44 may be in fact a PBX which requires allocation of bandwidth in order to complete a call through one of the mux's channels. The supervisory control block could also take the form of a computer terminal wherein an operator actually issues commands for reallocation of bandwidth resources based upon need, time of day, etc. When the slot allocation computer computes the actual slot list for a given channel, that slot list is transmitted via inband signaling to the other multiplexer's slot allocation computer and a coordinated allocation of time slots is carried out.

Figure 2:
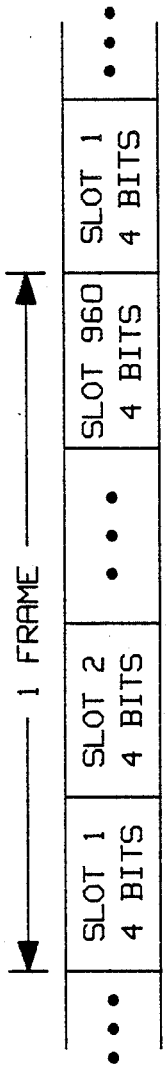
FIG. 2 shows an example frame and time slot arrangement for the preferred embodiment of the present invention.

In the preferred embodiment, the present invention is used in a T1 multiplexer, but this is not to be limiting. FIG. 2 shows the preferred framing arrangement for the present invention in which a frame is made up of 960 time slots, each of which is capable of carrying four bits of information (nibble interleaved). The inband signaling utilized may be a subset of CCITT signaling systems #7 or other known signaling formats as may be deemed suitable. A plurality of the time slots are set aside for use in accommodating this signaling.

Figure 3:
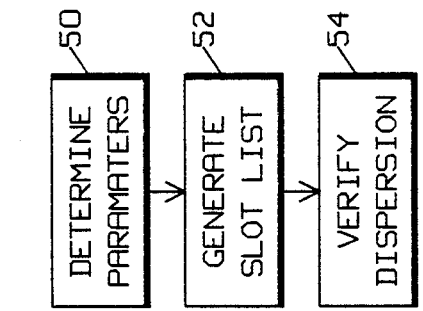
FIG. 3 shows a broad flow-chart of the slot allocation process of the present invention.

As previously stated, the present invention is directed toward a method and apparatus for allocating these time slots in a manner which efficiently utilizes the available bandwidth and allows for dynamic change without disrupting a communication process. Turning now to FIG. 3 a broad overview of the process of allocating these time slots is shown. This process is independent of the order in which connections are set up and will work with any size connection within system constraints. The process is independent of the size and location of bandwidth reserved for system overhead as well. The process begins with the step 50 of determining parameters required for the allocation process. The parameters determined include the total number of time slots in the frame, the number of time slots for a given baud rate and an allocation of memory. In the preferred T1 embodiment the total number of slots per frame is 960 and the frame rate is 400 hertz. Since each slot in the frame contains four bits, a single slot represents 1600 BPS of the total 1,536 MBPS available. All of the available baud rates are computed in terms of number of required time slots which is determined from the lookup table stored in ROM memory. A map of the entire frame is maintained in RAM memory for purposes of keeping track of the allocated and reserved time slots.

In step 50, which is carried out only once, the frame map is initialized and any bandwidth to be reserved for system overhead is marked. The number of slots required for specific connection is determined from a ROM table. The process then moves to step 52 which generates the slot list. Before generation of the slot list begins the process determines that enough slots are available to make the connection. Due to the dynamic nature of the system, it is not guaranteed that enough bandwidth will be available for a particular connection. The number of available slots is counted from the frame map and compared to the number required for the new channel. Once that it has been determined that sufficient bandwidth exists, the actual generation of the slots precedes by computation of the first slot in the list, generation of the remainder of slots to the list, and fitting this theoretical list into the existing frame to create an actual slot list.

Subsequent to slot list generation, the dispersion of the slot list is verified. Due to the dynamic nature of the system, the state of the existing allocation (through the allocation and deallocation of many channels over a period of time) could be arranged such that the dispersion required for the desired channel might not be met. The verification procedure simulates the FIFO to determine if an overflow or underflow condition would exist at any point in the frame. This is accomplished by making two passes through the entire frame.

Figure 4:
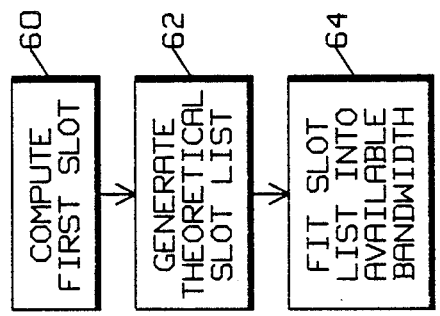
FIG. 4 shows a generalized flow chart of the slot list generation process of the present invention.

FIG. 4 broadly illustrates the previously described step 54 in which a first slot is computed at 60 followed by generation of theoretical slot list at 62. Finally the slot list generated in 62 is fitted with the available bandwidth at 64. This process of FIG. 4 will be described in greater detail later.

Figure 5:
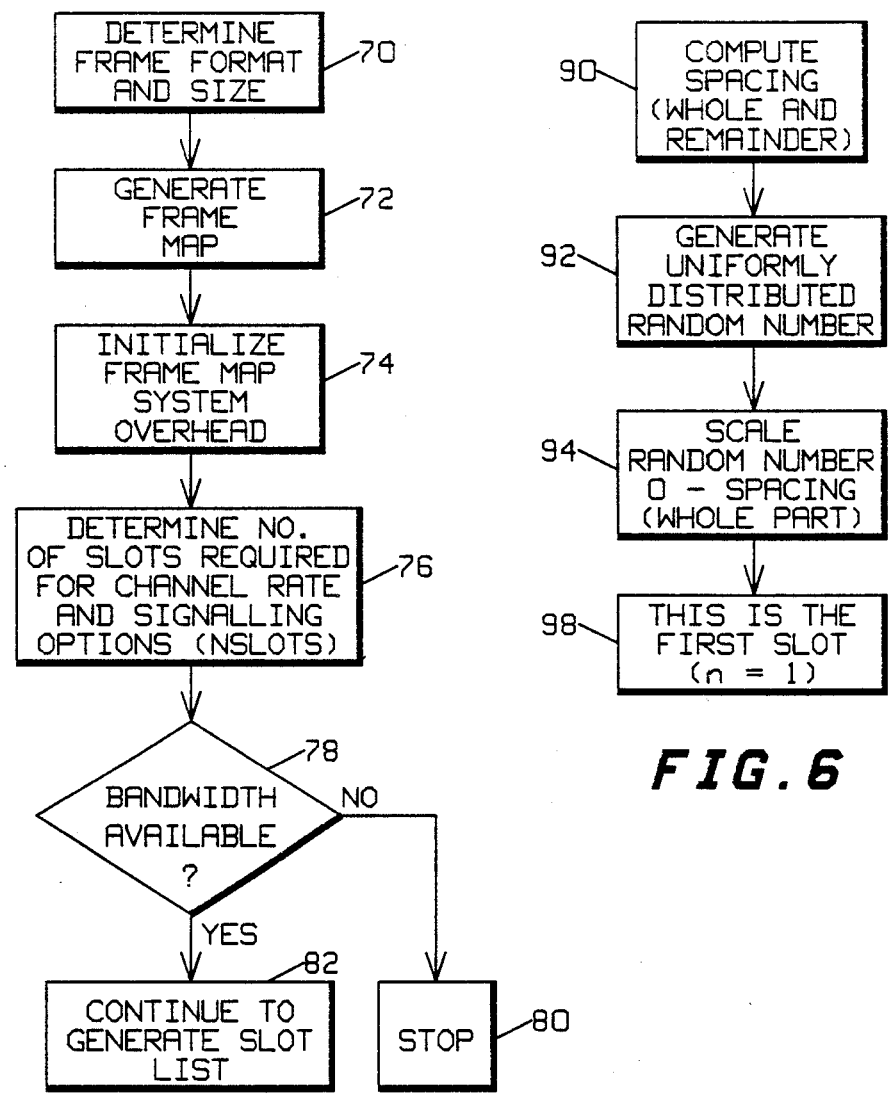
FIG. 5 is a flow chart showing the process of determining parameters as referred to in FIG. 3.

Turning now to FIG. 5, the process of determining parameters is shown wherein at step 70 the frame format and size is determined. Control then passes to 72 at which step a frame map is generated. This frame map is then initialized at 74 by addition relating to system overhead. Control then passes to 76 where the number of slots required for channel rate and signaling options is determined. Steps 70, 72 and 74 are performed only once as part of the first channel allocation. Subsequent channel allocations begin with step 76. This can either be computed as needed or at initialization and retrieved from RAM or ROM. A check is then made at 78 to determine if the required bandwidth is available, if not, the process stops at 80 and the call is rejected (e.g. busy signal connection reject message, etc. If the bandwidth is available at 78, the process continues to 82 where control is passed to the routine for generating the slot list as previously described in FIG. 4.

Figure 6:
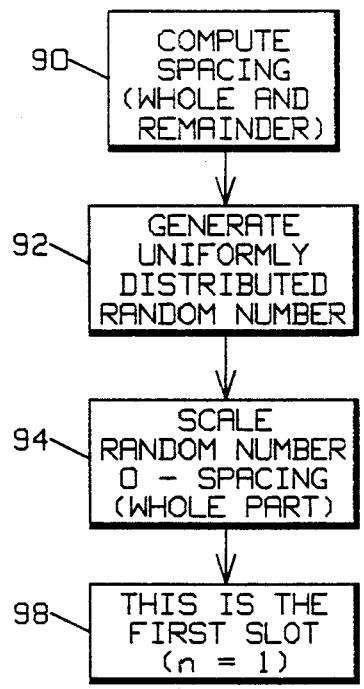
FIG. 6 is a flow chart describing the process of computing the first slot location in the slot list.

Turning now to FIG. 6 the process for generating the first slot in the slot list is illustrated. The process begins at step 90 where the required spacing between slots is computed resulting in a whole number plus a remainder. At step 92 a random number generator a generates uniformly distributed random number. At step 94 this random number is scaled so that it represents a position within the first spacing interval computed in step 90 (between 1 and the whole part of the spacing). If the first slot in the list is located in the first spacing interval (between 1 and spacing) it is guaranteed that the entire list will lie within the bounds of the frame (no wrap around will take place). For example, assume that the random number generator generates a number having value between 0 and 1 and assume that only two slots are required to accommodate the bandwidth needed for the connection at hand. In this case the spacing is computed by dividing two (the number of slots required) into 960 (the total number of slots in the frame). The result, 480, is the spacing between slots. The random number is then scaled so that it lies between 1 and 480. For example, assume that the random number generator produced the number 0.200. Since the range of the random number is 0 to 1 it need only be multiplied by the spacing (480) to be correctly scaled. Thus 96 =(0.200×480) would be the slot value of the first of two slots to be assigned at step 98. In this simple example, only one other slot needs to be assigned and ideally the slot would be assigned 480 slots ahead of 96 so that it would be slot number 576.

Figure 7:
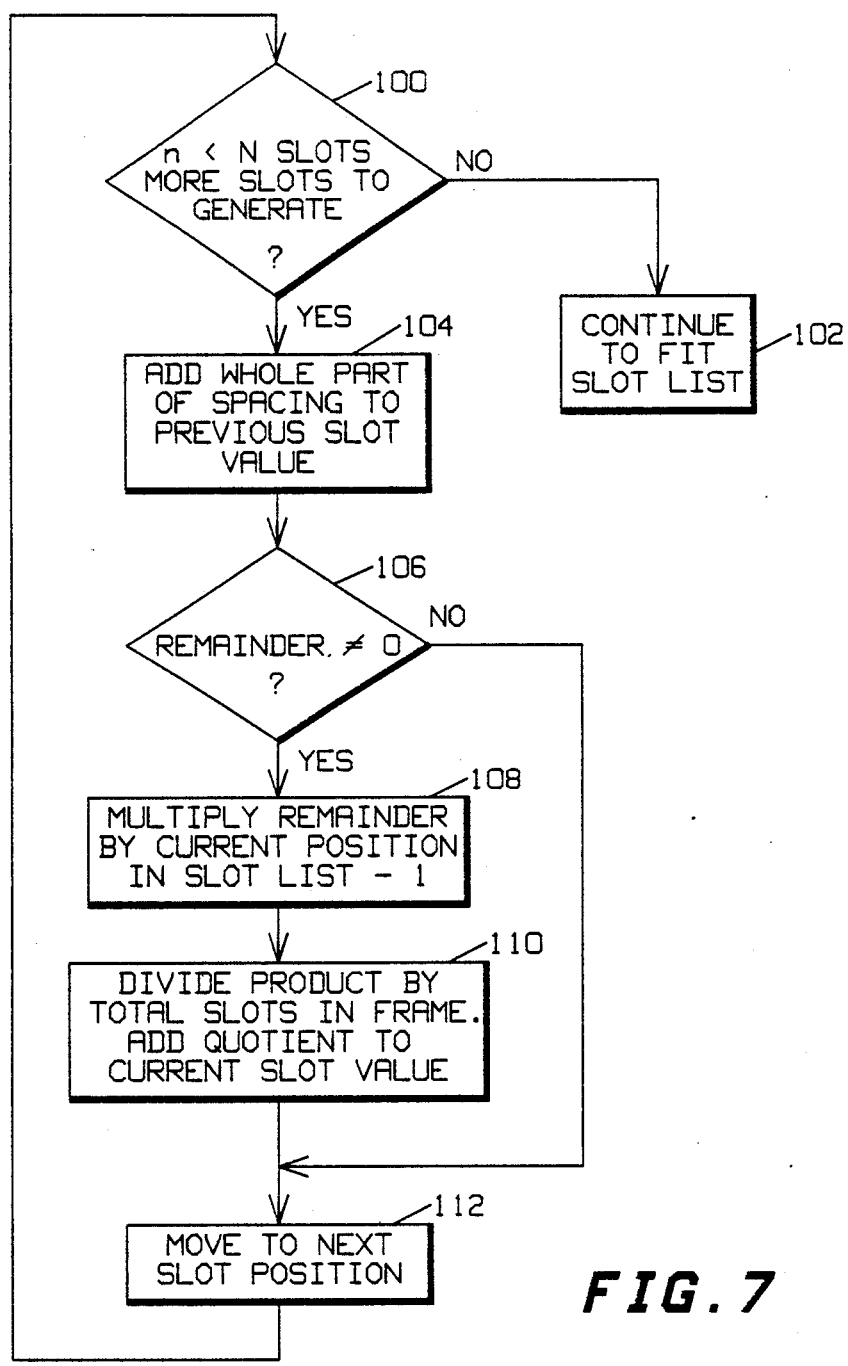
FIG. 7 is a flow chart describing the process of generating the theoretical slot list of the present invention.

Turning now to FIG. 7, the process for generating the remainder of the slots is illustrated starting at step 100 where it is determined whether or not there are more slots to generate. If not, control proceeds to the process illustrated in FIG. 8. If so, control passes to step 104 where the whole part of the spacing determined in step 90 is added to the previous slot value. If the remainder is not equal to 0 at 106 then it is multiplied by (current position −1) in the slot list at 108. This product is subsequently divided by the number of slots required for the channel at 110 and the result is then truncated and added to the current slot value at 110. The position in the slot list is incremented at 112. Control passes from 112 back to step 100. If the remainder is equal to 0 at step 106, control passes directly from 106 to 112. That is, the slot value is not increased by the fractional portion of the spacing. For example, if a channel required 384 slots in the frame the whole part of the spacing would be computed as 2 and the remainder would be 192 (representing an actual spacing of 2.5). If the first slot is determined by the above described method to be 1, the second slot would be 3. The third slot would be 6; the fourth slot would be 8; the fifth slot would be 11); and so forth.

Figure 8:
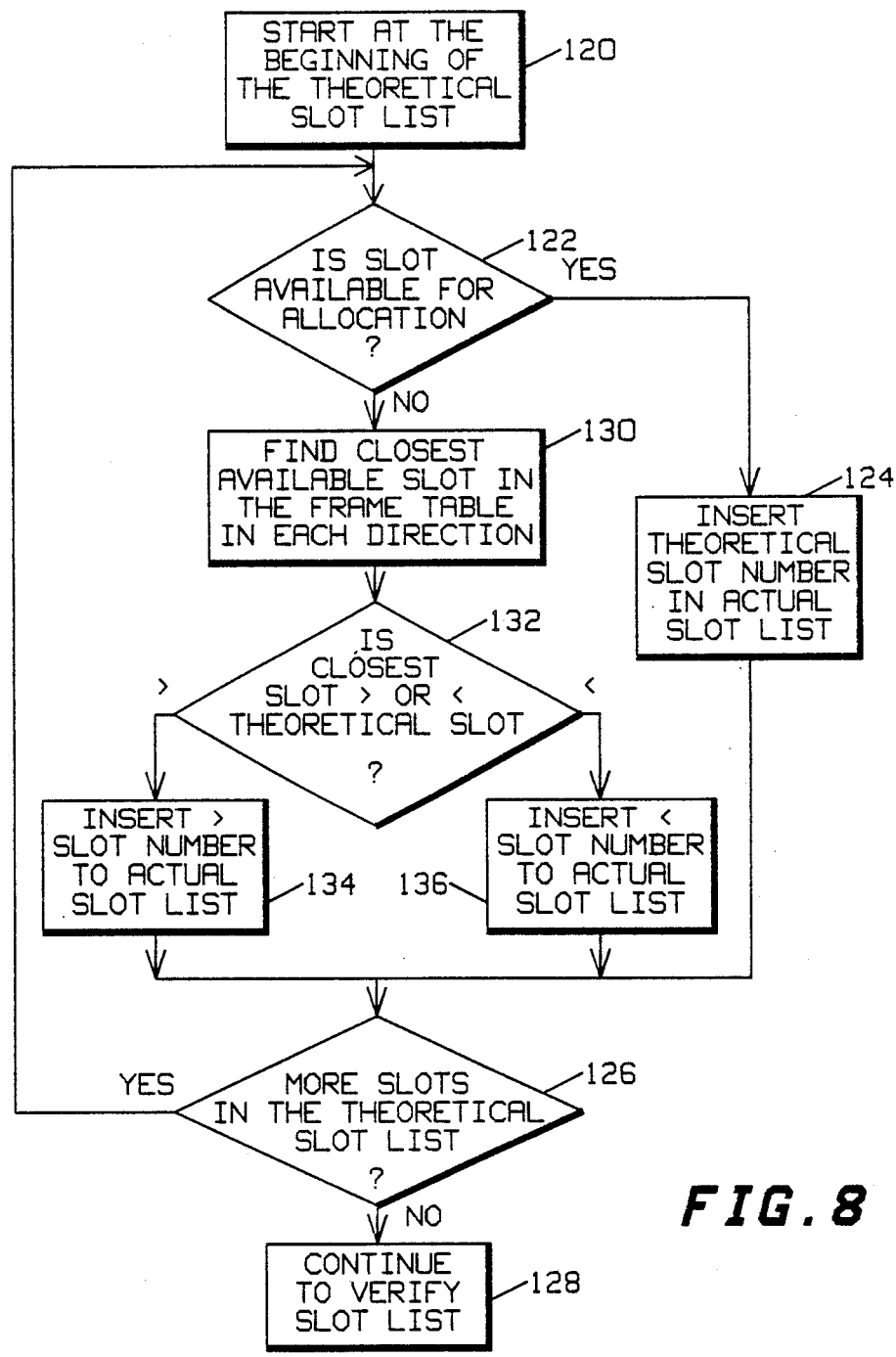
FIG. 8 is a flow chart describing the process of fitting the theoretical slot list to the available slots.

Turning now to FIG. 8, the process of matching the theoretical slot list to the frame is described starting at step 120 where the process starts at the beginning of the theoretical slot list. Control then passes then to step 122 where it is determined whether or not the theoretical slot is available for allocation. If so, control passes to 124 where the theoretical slot number is inserted into the actual slot list. Control then passes to 126 where it is determined whether or not additional slots require processing in the theoretical list. If so control passes back to step 122. If not, control passes to 128 which represents the verification process of FIG. 9. If the slot is not available for allocation at step 122, due to being allocated for system overhead or another channel, the closest available slot in the frame is found in each direction from the theoretical slot in step 130. Control then passes to 132 where it is determined which slot is closer. If the two slots lie the same distance from the theoretical slot, the left most or right most path may be arbitrarily selected. If the left most path is selected, control passes to 134 and the slot which is closest to the theoretical slot on the upper side is selected. If the path the the right is selected, the slot closest to the theoretical slot on the lower side is selected for the actual slot list. In either event, the idea is that the slot which is closest to the theoretical slot is that which is used in the actual slot list. Control passes from 134 or 136 to step 126.

Figure 9:
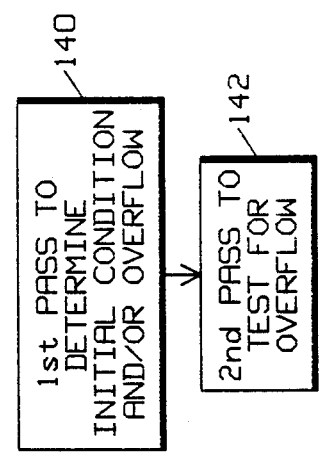
FIG. 9 is a broad flow chart describing the process of verifying the dispersion of the actual slot list.

Turning now to FIG. 9 the verification process is outlined. As previously described, slot list verification is a two step process with the first pass being used to establish the initial condition of the FIFO and/or determine if an overflow condition exists. This step is represented by step 140 in FIG. 9. The second pass is represented by step 142 in FIG. 9. As previously described, the process is that of simulating the operation of the FIFOs to determine whether or not there will be a buffer overflow. this verification is based on 5 premises. They are: (1) an underflow of the FIFO buffer will cause a reset to 0; (2) During the period of 1 complete frame, exactly the same number of data bits will be taken from the buffer as inserted; (3) due to the periodic nature of the system (i.e.: the change in the volume of buffered data over the entire frame is 0), an overflow will always have a corresponding underflow; (4) underflow will most probably occur on the first pass but cannot occur on subsequent passes since the FIFO initially starts at 0 and can only be greater or equal to 0; (5) an overflow occurring on the first or subsequent passes immediately indicates a dispersion error.

Figure 10:
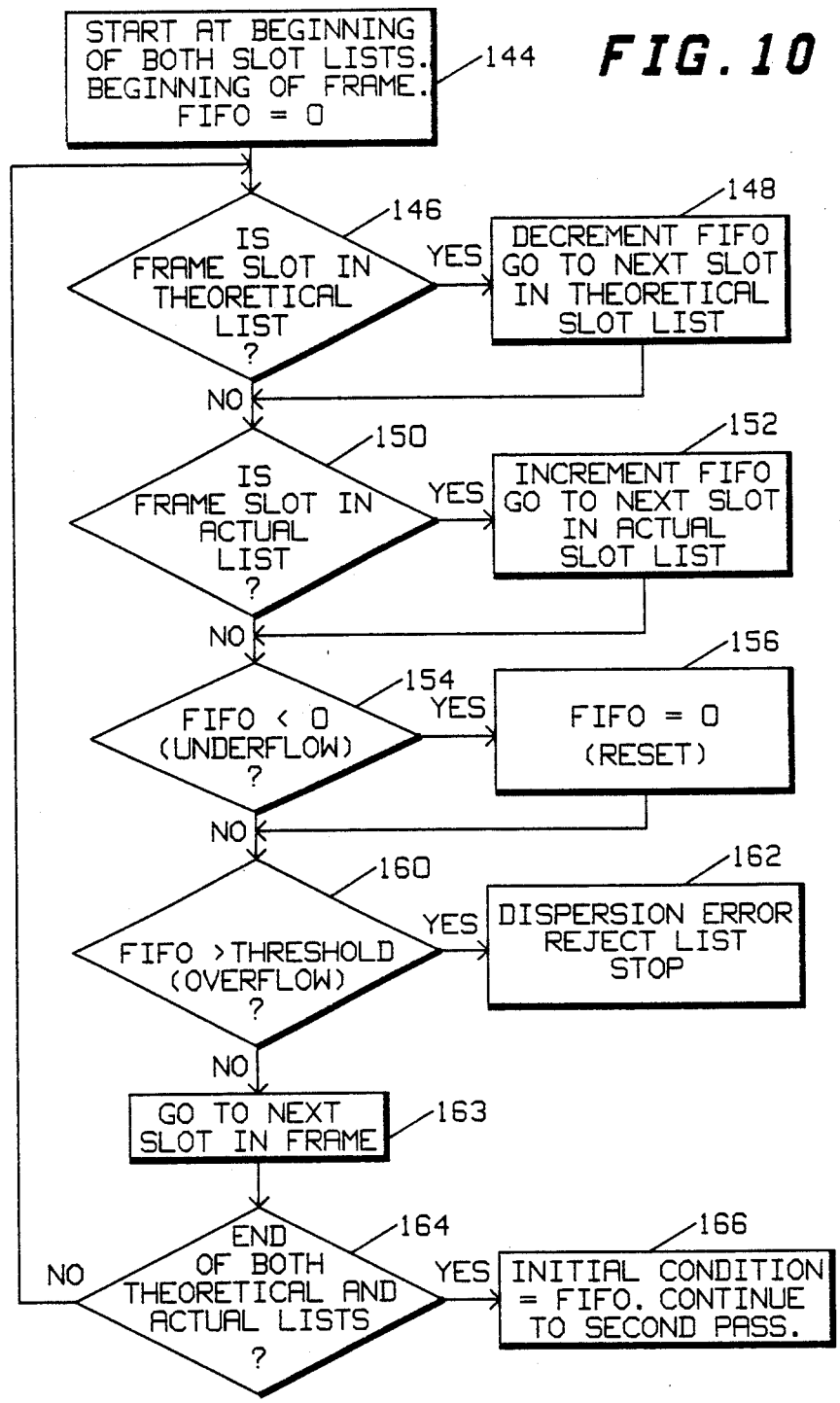
FIG. 10 is a flow chart describing the process of the first verification pass of the present invention.

The first pass is illustrated in FIG. 10 starting at step 144. At this step, the FIFO depth is initialized to 0 and the process starts at the beginning of both slot lists at the beginning of the frame. Control then passes to 146 where the process checks to see if the frame slot is in the theoretical list. If yes, the FIFO is decremented and a pointer is moved to the next slot in the theoretical slot list at 148. Control then passes to 150. If the answer is no at 146, control passes directed to 150 bypassing step 148. At step 150, it is determined whether or not the frame slot is in the actual list and if so, control passes to 152. If not, control passes to 154. At 152 the FIFO is incremented and pointer moves to the next slot in the actual slot list. Control then passes from 152 to 154. At 154 the FIFO is checked for an underflow condition and if an underflow has occurred, control passes to 156 where the FIFO is reset to 0. Control then passes to 160. If an underflow has not occurred at step 154, control passes directly from 154 to 160 bypassing step 156.

Depending upon the actual parameters of the system, a threshold can be set on the FIFO to determine whether or not an overflow has occurred in the FIFO. Due to the truncation error in the slot generation procedure, any slot in the theoretical list could be, at most, one position off. In addition, since the actual sampling of the channel is asynchronous to the sampling of the TDM interface, another error component of up to one slot position could be introduced. These error terms should be preferably subtracted from the buffer size to obtain the threshold. Other systems may have other factors which should be considered when establishing a threshold. In the preferred embodiment, the FIFO's are 16 nibbles deep. The threshold selected for the preferred embodiment is 14 so that if the FIFO exceeds 14 nibbles in depth, an overflow is assumed to have occurred. This threshold allows a margin of safety to assure that overflow conditions never occur.

At step 160, the FIFO depth is compared with the threshold to determine if an overflow has occurred. If so, a dispersion error is deemed to have occurred at 162 and the list is rejected, resulting in a rejected call or rejected connection (busy signal, etc.). This is due to the fact that the initial condition is assumed to be zero on the first pass when it can actually only be greater or equal to zero. An overflow on the first pass will always occur on subsequent passes. If no overflow occurs at 160, control passes to 162 and a pointer is moved to the next slot in the frame. Control then passes to 164 where the theoretical and actual slot lists are checked to see if the end has been reached. If not, the slot list pointers are moved to the next slot in each list and control passes back to step 146. If so, the current condition of the FIFO's are used as the initial condition for the second pass at step 166.

Figure 11:
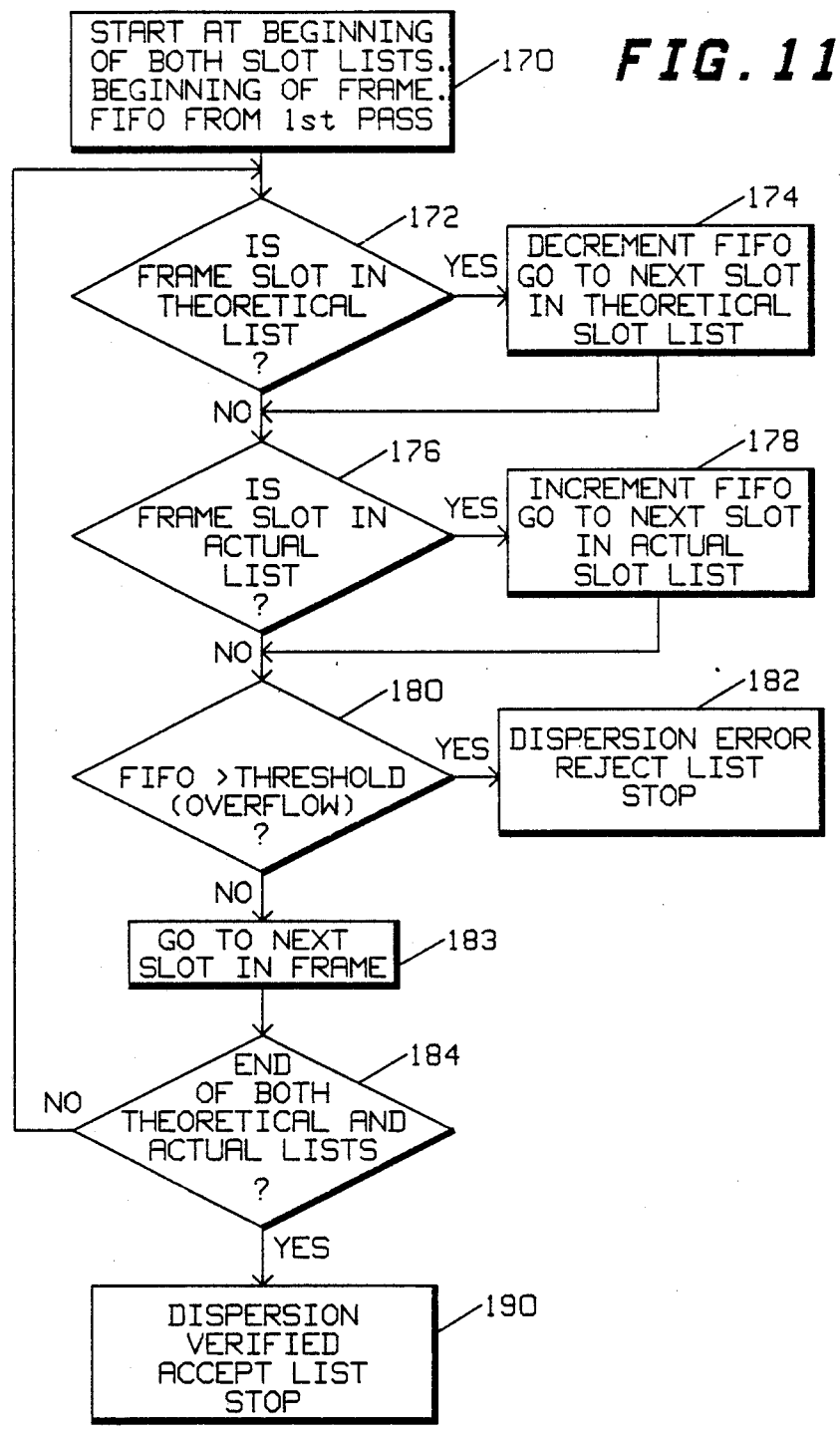
FIG. 11 is a flow chart describing the second pass of the verification process of the present invention.

Turning now to FIG. 11, the second pass is illustrated and both slot list pointers are initialized at 170. Control then passes to 172 which performs the same function as step 146. The decrementing step 174 performs indentically to step 148 of FIG. 10. In a similar manner, step 176 and step 178 are identical to steps 150 and 152. In a similar manner, steps 180 and 182 perform the same functions as step 160 and 162 if no overflow occurs at 180 the slot counter is incremented at 183 and control passes to 184 where it is determined whether or not the end of the actual and theoretical lists have been reached. If not, the slot list pointers are moved to the net slot in each list and control passes back to 172. If so, control passes to 190 representing verification and acceptance of the slot list (call accepted).

Those skilled in the art will appreciate that the processes of FIGS. 10 and 11 are very similar thus lending themselves to sharing of the computer code used to implement them.

While the present invention has been described in terms of an embodiment using a programmed processor, those skilled in the art will appreciate that other embodiments are within the scope of the invention. For example, hard wired logic equivalents may be designed and may be implemented as large scale integrated circuits. Other variations and equivalents will occur to those skilled in the art.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. In a time division multiplex system for communicating information from a plurality of channels over a common communications medium, wherein said information is carried in a number of time slots which are allocated according to bandwidth requirements of each said channels, a method of assigning positions for said time slots in a repetitive frame of said time slots, said time slots being representable as a position within said frame, comprising the steps of:
    determining a quantity of said time slots which are required to provide enough bandwidth to carry information from one of said channels, said quantity of said time slots including a first time slot and one or more remaining time slots;
    generating a random number;
    assigning a first of said positions within said frame of a first of said quantity of time slots based upon the value of said random number; and
    assigning one or more additional positions for said one or more remaining time slots required by said determining step.

2. The method of claim 1, further comprising the step of adjusting the assigned positions thereby providing adjusted positions to fit within unassigned positions of said frame.

3. The method of claim 2, wherein said adjusting step includes adjusting the positions assigned in said assigning steps so that assigned positions are adjusted to a closest unassigned position.

4. The method of claim 2, wherein said time division multiplex system includes a buffer and further comprising the step of verifying that the adjusted positions can support the bandwidth of said channel without overflow of said buffer.

5. The method of claim 3, wherein said time division multiplex system includes a buffer and wherein verifying step includes the steps of:
    simulating use of said adjusted positions in carrying said frame of time slots;
    monitoring a buffer depth required by said simulating to use said adjusted positions; and
    comparing said required buffer depth from said simulating with a threshold which is indicative that said adjusted positions will not cause an overflow of said buffer.

6. The method of claim 5, wherein said simulating step includes:
    simulating a first occurrence of said frame to determine an initial state of said buffer; and
    simulating a second consecutive occurrence of such frame to determine if said buffer overflows.

7. The method of claim 6, further comprising the step of rejecting said adjusted positions in the event said buffer overflows.

8. The method of claim 1, wherein said step of generating said random number is carried out by a method which randomly generates a uniform distribution of numbers.

9. In a time division multiplex system for communicating information from a plurality of channels over a common communications medium, wherein said information is carried in a number of time slots which are allocated according to bandwidth requirements of each said channels, a method of assigning positions for said time slots in a repetitive frame of said time slots, said time slots being representable as a position within said frame, comprising the steps of:
    determining a quantity of said time slots which are required to provide enough bandwidth to carry information from one of said channels, said quantity of said time slots including a first time slot and one or more remaining time slots;
    dividing the number of time slots in said frame by a said quantity of time slots to determine an ideal spacing for distribution of said quantity of time slots;
    generating a random number;
    scaling said random number to said spacing so that said random number represents a position within said spacing;
    preliminarily assigning said position within said frame to a first of said quantity of time slots;
    preliminarily assigning one or more additional positions for said one or more remaining time slots so that said additional positions are assigned to intervals separated approximately by said spacing;
    fitting said preliminarily assigned positions to said frame by adjusting said preliminary assignments to positions within said frame which are not occupied;
    simulating use of said frame with said adjusted assignment of positions for carrying said frame of time slots to initialize a buffer;
    simulating use of said frame with said adjusted assignment of positions for carrying said frame of time slots to determine if said buffer overflows; and
    rejecting said adjusted assignment of positions if said buffer overflows.

10. In a time division multiplex system for communicating information from a plurality of channels over a common communications medium, wherein said information is carried in a number of time slots which are allocated according to bandwidth requirements of each said channels, an apparatus for assigning positions for said time slots in a repetitive frame of said time slots, said time slots being representable as a position within said frame, comprising in combination:

determining means for determining a quantity of said time slots which are required to provide enough bandwidth to carry information from one of said channels, said quantity of said time slots including a first time slot and one or more remaining time slots;

generating means for generating a random number;

assigning means for assigning a first of said positions within said frame of a first of said quantity of time slots based upon the value of said random number, and for assigning one or more additional positions for said one or more remaining time slots required by said determining means.

11. The apparatus of claim 10, further comprising means for fitting said assigned positions to unassigned positions in said frame.

12. The apparatus of claim 10, further comprising:
    buffering means for buffering information to be placed in said time slots; and
    verification means for verifying that said assigned positions do not result in a buffer overflow if used.

13. The apparatus of claim 12, wherein said verification means includes means for simulating use of said frame to carry data and means for determining if said buffering means ovrflows during said simulation.

14. The apparatus of claim 10, wherein said generating means includes means for generating an approximately uniformly distributed random number.

* * * * *